United States Patent
Cheng et al.

(10) Patent No.: US 11,265,818 B2
(45) Date of Patent: Mar. 1, 2022

(54) METHOD OF CLOSED-LOOP POWER CONTROL IN MULTI-PANEL TRANSMISSION AND RELATED DEVICE

(71) Applicant: FG Innovation Company Limited, Tuen Mun (HK)

(72) Inventors: Yu-Hsin Cheng, Hsinchu (TW); Chia-Hao Yu, Yilan (TW)

(73) Assignee: FG Innovation Company Limited, Tuen Mun (HK)

( * ) Notice: Subject to any disclaimer, the term of this patent is extended or adjusted under 35 U.S.C. 154(b) by 83 days.

(21) Appl. No.: 16/831,665

(22) Filed: Mar. 26, 2020

(65) Prior Publication Data

US 2020/0314763 A1 Oct. 1, 2020

Related U.S. Application Data

(60) Provisional application No. 62/826,136, filed on Mar. 29, 2019.

(51) Int. Cl.
*H04W 52/14* (2009.01)
*H04W 52/32* (2009.01)
*H04W 72/04* (2009.01)
*H04L 5/00* (2006.01)
*H04W 52/34* (2009.01)

(52) U.S. Cl.
CPC ......... *H04W 52/146* (2013.01); *H04L 5/0053* (2013.01); *H04W 52/325* (2013.01); *H04W 52/34* (2013.01); *H04W 72/042* (2013.01); *H04W 72/0413* (2013.01)

(58) Field of Classification Search
CPC ............. H04W 52/146; H04W 52/325; H04W 72/042; H04W 52/34; H04W 52/42; H04W 72/0413; H04L 5/0091; H04L 5/0053

See application file for complete search history.

(56) References Cited

U.S. PATENT DOCUMENTS

| 2013/0208692 A1* | 8/2013 | Seo ........................ H04L 1/1829 370/329 |
| 2013/0250901 A1* | 9/2013 | Oizumi ................. H04L 1/1854 370/329 |
| 2018/0332541 A1* | 11/2018 | Liu ....................... H04W 52/241 |
| 2019/0173563 A1* | 6/2019 | Kakishima ........... H04B 7/0626 |
| 2019/0190747 A1* | 6/2019 | Park ..................... H04B 7/0639 |

(Continued)

OTHER PUBLICATIONS

ETSI, "ETSI TS 138 213 V15.3.0 (Oct. 2018) 5G; NR; Physical layer procedures for control (3GPPTS 38.213 version 15.3.0 Release 15)," ETSI, Tech. Rep., Oct. 2018. (Year: 2018).*

*Primary Examiner* — Ayaz R Sheikh
*Assistant Examiner* — Tarell A Hampton
(74) *Attorney, Agent, or Firm* — ScienBiziP, P.C.

(57) ABSTRACT

A method of closed-loop power control for a user equipment (UE) in multi-panel transmission is disclosed. The method comprises receiving a transmission power control (TPC) command indicating at least a power control adjust value carried by downlink control information (DCI), obtaining antenna panel information for identifying a characteristic of one of a plurality of antenna panels of the UE, and applying the power control adjust value to at least one antenna panel for physical uplink (UL) shared channel (PUSCH)/physical UL control channel (PUCCH) transmission according to the obtained antenna panel information.

18 Claims, 2 Drawing Sheets

(56) References Cited

U.S. PATENT DOCUMENTS

| | | | |
|---|---|---|---|
| 2019/0253986 A1* | 8/2019 | Jeon | H04W 72/042 |
| 2019/0364511 A1* | 11/2019 | Chen | H04W 52/08 |
| 2020/0100232 A1* | 3/2020 | Onggosanusi | H04B 7/0695 |
| 2020/0229104 A1* | 7/2020 | MolavianJazi | H04W 52/146 |
| 2020/0336990 A1* | 10/2020 | Chen | H04L 5/0048 |
| 2020/0358494 A1* | 11/2020 | Tang | H04W 72/042 |
| 2020/0358577 A1* | 11/2020 | Takeda | H04L 5/0023 |
| 2020/0383060 A1* | 12/2020 | Park | H04W 52/242 |
| 2021/0092732 A1* | 3/2021 | Lee | H04W 72/0413 |
| 2021/0212105 A1* | 7/2021 | Takeda | H04L 1/1822 |

\* cited by examiner

METHOD OF CLOSED-LOOP POWER CONTROL IN MULTI-PANEL TRANSMISSION AND RELATED DEVICE

CROSS-REFERENCE TO RELATED APPLICATION(S)

The present application claims the benefit of and priority to a provisional U.S. Patent Application Ser. No. 62/826,136 filed on Mar. 29, 2019, entitled "Mechanism for Panel-specific Close-loop Power Control," (hereinafter referred to as "the '136 provisional"). The disclosure of the '136 provisional is hereby incorporated fully by reference into the present disclosure.

FIELD

The present disclosure generally relates to wireless communications, and more particularly, to a method of power control in multi-panel transmission and a related device.

BACKGROUND

The Third Generation Partnership Project (3GPP) in Release 15 introduces new designs for new radio (NR) close-loop power control that can be achieved by downlink (DL) control information (DCI), such as DCI format 0_0/0_1 and DCI format 2_2.

In detail, DCI format 0_0/0_1 includes an information element (IE) of transmission power control (TPC) command for indicating a power control adjust value for a physical uplink (UL) shared channel (PUSCH). Moreover, a user equipment (UE) may maintain two power control states (e.g. state 0 and state 1), and a base station (BS) may indicate which power control state is applied for PUSCH transmission with DCI format 0_0/1_0. Therefore, the UE applies the power control state associated with an antenna panel for the PUSCH transmission according to a power control adjust value of "TPC command" of DCI format 0_0/0_1.

In addition, DCI format 2_2 may include power adjustment indicator (e.g. power control adjust state index or power control adjust accumulation state index) for indicating an index of a power control state, and the "TPC command" for a physical UL control channel (PUCCH) and/or a PUSCH. In addition, DCI format 2_2 is a group-cast DCI, and each UE may be assigned a specific index (i.e. tpc-Index) for determining a position of a first bit of the "TPC command" inside a payload of the DCI format 2-2.

On the other hand, 3GPP Rel-15 introduces multi-panel transmission. However, there is no mechanism of power control for PUSCH/PUCCH transmission in multi-panel transmission. In other words, there is no panel-specific power control scheme for the UE to apply a power control adjust state or power control adjust value to a specific antennal panel for PUCCH/PUSCH transmission when receiving the DCI. Therefore, there is a need for closed-loop power control in multi-panel transmission and a related device for the next generation (e.g. fifth generation (5G) NR) wireless communication systems.

SUMMARY

The present disclosure is directed to a method of closed-loop power control in multi-panel transmission and a related device.

According to an aspect of the present disclosure, a method of closed-loop power control for a user equipment (UE) in multi-panel transmission is disclosed. The method comprises receiving a transmission power control (TPC) command indicating at least a power control adjust value carried by downlink control information (DCI), obtaining antenna panel information for identifying a characteristic of one of a plurality of antenna panels of the UE, and applying the power control adjust value to at least one antenna panel for physical uplink (UL) shared channel (PUSCH)/physical UL control channel (PUCCH) transmission according to the obtained antenna panel information.

According to another aspect of the present disclosure, a user equipment (UE) in a wireless communication system is disclosed. The UE comprises a processor, for executing computer-executable instructions, and a non-transitory machine-readable medium, coupled to the processor, for storing the computer-executable instructions, wherein the computer-executable instructions instruct the processor to receive a transmission power control (TPC) command indicating at least a power control adjust value carried by downlink control information (DCI), obtain antenna panel information for identifying a characteristic of one of a plurality of antenna panels of the UE, and apply the power control adjust value to at least one antenna panel for physical uplink (UL) shared channel (PUSCH)/physical UL control channel (PUCCH) transmission according to the obtained antenna panel information.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
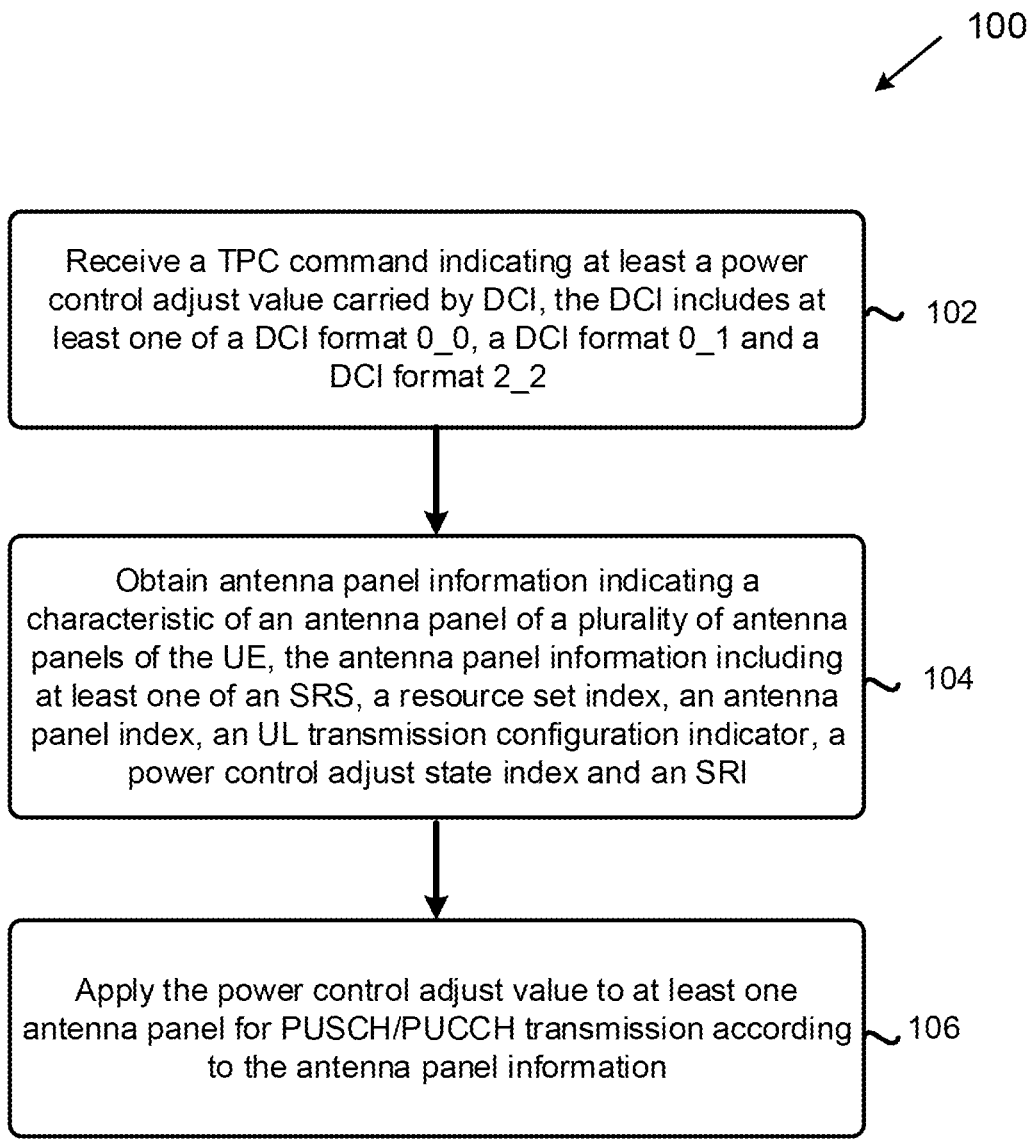
FIG. 1 is a flowchart illustrating a method by a UE for closed-loop power control in multi-panel transmission, in accordance with example implementations of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art.

Unless noted otherwise, like or corresponding elements in the figures may be indicated by like or corresponding reference numerals. Moreover, the drawings and illustrations are generally not to scale and are not intended to correspond to actual relative dimensions.

For the purpose of consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components and is not necessarily limited to physical connections. The term "comprising" means "including, but not necessarily limited to" and specifically indicates open-ended inclusion or membership in the described combination, group, series and equivalents.

Additionally, for the purposes of explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software or a combination of software and hardware. Described functions may correspond to modules that are software, hardware, firmware, or any combination thereof.

The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s).

The microprocessors or general-purpose computers may be formed of applications specific integrated circuitry (ASIC), programmable logic arrays, and/or using one or more digital signal processor (DSPs). Although some of the disclosed implementations are oriented to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions. A radio communication network architecture (e.g., a long term evolution (LTE) system, an LTE-Advanced (LTE-A) system, or an LTE-Advanced Pro system) typically includes at least one BS, at least one UE, and one or more optional network elements that provide connection with a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet via a radio access network (RAN) established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the UMTS, an evolved node B (eNB) as in the LTE-A, a radio network controller (RNC) as in the UMTS, a BS controller (BSC) as in the GSM/GERAN, an NG-eNB as in an E-UTRA BS in connection with the 5GC, a next generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells.

Each cell is operable to provide services to at least one UE within radio coverage of the cell. More specifically, each cell (often referred to as a serving cell) provides services to serve one or more UEs within the cell's radio coverage, (e.g., each cell schedules the DL and optionally UL resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe). Each cell may have overlapped coverage areas with other cells.

FIG. 1 illustrates a method 100 for a UE to perform closed-loop power control in multi-panel transmission according to the present disclosure. In action 102, the UE receives a TPC command indicating at least a power control adjust value carried by a DCI. In action 104, the UE obtains antenna panel information indicating a characteristic of an antenna panel of a plurality of antenna panels of the UE. In action 106, the UE applies the power control adjust value to at least one antenna panel for PUSCH/PUCCH transmission according to the antenna panel information.

The method 100 achieves panel-specific power configuration for PUSCH/PUCCH transmission using antenna panel information. More specifically, the UE may associate the power control adjust value indicated by the TPC command with an individual antenna panel based on the antenna panel information.

Note that, the antenna panel information (e.g. a panel-specific power control signaling) may be transmitted from the BS with the DCI format 0_0, the DCI format 0_1 or the DCI format 2_2, or with radio resource control (RRC) signaling. Moreover, the antenna panel information may be obtained by the UE with predetermined rules. Various cases are disclosed.

CASE 1: DCI format 0_0

A power control adjust value is applied to the power control adjust state of an antenna panel via which the UE receives the DCI format 0_0. The antenna panel information is obtained via the DCI format 0_0, and the UE applies the power control adjust value to the antenna panel via which the DCI format 0_0 is received. The closed-loop power control operation or panel-specific power configuration performed by the UE may include several steps.

In a first step, the UE reports a number of antenna panels supported by UE capability, and the BS configures the number of supported active antenna panels and/or sounding reference signal (SRS) resource sets to the UE. For example, if the UE reports "8" supported antenna panels, the BS configures the UE with SRS resource set #0, SRS resource set #1, SRS resource set #2, and SRS resource set #3.

In a second step, the UE receives the DCI format 0_0 on a control resource set (CORESET) associated with the SRS resource set #1, and the DCI format 0_0 contains a power control adjust value (e.g. TPC command). In a third step, the UE applies the TPC command (e.g. "11" indicates increasing 3 dB TX power) to the SRS resource set #1 with power control adjust accumulation (e.g. tpc-Accumulation parameter) for PUSCH transmission.

A power control adjust value is applied to the power control adjust state of an antenna panel according to the antenna panel information received in the DCI format 0_0. For example, the antenna panel information may include at least one of an SRS resource set index, an antenna panel index, an UL transmission configuration indicator (TCI), a power control adjust state index and an SRS resource index (SRI). Therefore, the UE applies the power control adjust value to the antenna panel associated with the SRS resource set index, the antenna panel index or the SRI indicated in the antenna panel information.

The closed-loop power control operation performed by the UE may include several steps. In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the UE receives DCI format 0_0 on the CORESET that is associated with SRS resource set #1, and the DCI format 0_0 contains a power control adjust value (e.g. TPC command) and antenna panel information that indicates SRS resource set index "11"). In a third step, the UE applies the TPC command (e.g. "11" indicates increasing 3 dB TX power) to the indicated SRS resource set index (e.g. "11" indicates SRS resource set #3) with power control adjust accumulation (e.g. tpc-Accumulation parameter) for PUSCH transmission.

A power control adjust value is applied to the power control adjust state of an antenna panel according to the antenna panel information (e.g. SRS resource set index, antenna panel index, and/or TCI) corresponding to a specific PUCCH resource index (e.g. the lowest index) within the active UL bandwidth part (UL BWP) of the cell. The detailed closed-loop power control operation performed by the UE may include several steps.

In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the BS configures the UE with 16 PUCCH resource configurations, where each PUCCH resource is associated with an antenna panel via the antenna panel information (e.g. SRS resource set index, antenna panel index, and/or TCI). For example, PUCCH resource #0, PUCCH resource #1, PUCCH resource #2 and PUCCH resource #3 are all associated with the SRS resource set #0.

In a third step, the UE receives DCI format 0_0 on the CORESET that is associated with SRS resource set #1, and the DCI format 0_0 contains a power control adjust value (e.g. TPC command). In a fourth step, the UE applies the TPC command (e.g. "11" indicates increasing 3 dB TX power) to the SRS resource set #0 corresponding to the PUCCH resource having a predetermined index (e.g. the lowest PUCCH resource index, PUCCH resource #0) with power control adjust accumulation (e.g. tpc-Accumulation parameter) for PUCCH transmission.

CASE 2: DCI format 0_1

A power control adjust value is applied to the power control adjust state of an antenna panel via which the UE receives the DCI format 0_1. The antenna panel information is obtained via the DCI format 0_1, and the UE applies the power control adjust value to the antenna panel via which the DCI format 0_1 is received.

The closed-loop power control operation performed by the UE may include several steps. In a first step, the UE reports a number of antenna panels supported by UE capability, and the BS configures the number of active antenna panels and/or SRS resource sets to UE. For example, if the UE reports "8" supported antenna panels, the BS configures the UE with SRS resource set #0, SRS resource set #1, SRS resource set #2, and SRS resource set #3.

In a second step, the UE receives DCI format 0_1 on the CORESET that is associated with SRS resource set #1, and the DCI format 0_1 contains power control adjust value (e.g. TPC command). In a third step, the UE applies the TPC command (e.g., "11" indicates increasing 3 dB TX power) to the SRS resource set #1 with power control adjust accumulation (e.g. tpc-Accumulation parameter) for PUSCH transmission.

A power control adjust value is applied to the power control adjust state of an antenna panel according to the antenna panel information (e.g. SRS resource set index, antenna panel index, and/or TCI) received in the DCI format 0_1.

The closed-loop power control operation performed by the UE may include several steps. In a first step, the UE reports a number of antenna panels supported by UE capability, and the BS configures the number of active antenna panels and/or SRS resource sets to UE. For example, if the UE reports "8" supported antenna panels, the BS configures the UE with SRS resource set #0, SRS resource set #1, SRS resource set #2, and SRS resource set #3.

In a second step, the UE receives DCI format 0_1 on the CORESET that is associated with SRS resource set #1, and the DCI format 0_1 contains power control adjust value (e.g. TPC command) and the antenna panel information (e.g. SRS resource set index "11"). In a third step, the UE applies the TPC command (e.g., "11" indicates increasing 3 dB TX power) to the indicated SRS resource set index (e.g. SRS resource set index "11" indicates SRS resource set #3) with power control adjust accumulation (e.g. tpc-Accumulation parameter) for PUSCH transmission.

A power control adjust value is applied to the power control adjust state according to the antenna panel information (e.g. SRS resource set index, antenna panel index, and/or TCI) received in the DCI format 0_1. It is noted that the UE may obtain the antenna panel information based on a relationship between the SRS resource indicated by the DCI format 0_1 and the antenna panel. The relationship may be configured in RRC signaling.

The closed-loop power control operation performed by the UE may include several steps. In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the BS configures the UE with 16 SRS resource configurations, where each SRS resource is associated with information of one antenna panel (e.g. SRS resource set index, antenna panel index, and/or TCI). For example, SRS resource #0, SRS resource #1, SRS resource #2 and SRS resource #3 are all associated with SRS resource set #0, that could be configured by the BS with RRC signaling. In a third step, the UE receives DCI format 0_1 on the CORESET that is associated with SRS resource set #1, and the DCI format 0_1 contains power control adjust value (e.g. TPC command) and the SRS resource indicator (i.e. SRI). The UE transmits PUSCH using the same antenna port(s) as the SRS port(s) in the SRI.

In a fourth step, the UE applies the TPC command (e.g. "11" indicates increasing 3 dB TX power) to the SRS resource set #0 based on the SRS resource indicated by the SRI in the DCI format 0_1 (e.g. SRI "0011" indicates the SRS resource #3) with power control adjust accumulation (e.g. tpc-Accumulation parameter) for PUSCH transmission.

CASE 3: DCI format 2_2

There are three different approaches for DCI format 2_2. A first approach is that each power control adjust state corresponds to one antenna panel. A second approach is that each antenna panel may have more than one power control adjust state. A third approach is that multiple antenna panels may be associated with a single power control adjust state.

Approach #1: One Panel with One Power Control Adjust State

The UE may apply a power control adjust value to an antenna panel indicated by the antenna panel information if a power control adjust state is mapped one-to-one to an antenna panel. In other words, power control adjust states indicated in the DCI format 2_2 are mapped one-to-one to antenna panels. For example, if the UE supports 4 antenna panels, the UE assumes there are 2 bits in the DCI format 2_2 to indicate a power control adjust state. Therefore, the UE may apply The PC command to the antenna panel with index "00" if the bit field is "00".

The closed-loop power control operation performed by the UE may include several steps. In a first step, the UE reports a number of antenna panels supported by UE capability, and the BS configures the number of active antenna panels and/or SRS resource sets to UE. For example, if the UE reports "8" supported antenna panels, the BS configures the UE with SRS resource set #0, SRS resource set #1, SRS resource set #2, and SRS resource set #3.

In a second step, the UE receives DCI format 2_2 on the CORESET that is associated with SRS resource set #1, and the DCI format 2_2 contains power control adjust value (e.g. TPC command) and power control adjust state index.

In a third step, the UE applies the TPC command (e.g. "11" indicates increasing 3 dB TX power) to SRS resource set #1 with power control adjust accumulation (e.g., tpc-Accumulation parameter) for PUSCH transmission because the power control adjust index in the DCI format 2_2 is "01" (one-to-one mapping to the SRS resource set #1).

The DCI format 2_2 may directly indicate antenna panel information (e.g. SRS resource set index, antenna panel index, and/or TCI) such that the UE applies the TPC command to the indicated antenna panel. The closed-loop power control operation performed by the UE may several steps.

In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3. In a second step, the UE receives DCI format 2_2 on the CORESET that is associated with SRS resource set #1, and the DCI format 2_2 contains power control adjust value (e.g. TPC command) and antenna panel information (e.g. SRS resource set index).

In a third step, the UE applies the TPC command (e.g. "11" indicates increasing 3 dB TX power) to the SRS resource set #1 (e.g. antenna panel information is "01", that corresponds to the SRS resource set #1) indicated in DCI format 2_2 with power control adjust accumulation (e.g. tpc-Accumulation parameter) for PUSCH transmission.

The UE may be configured with panel-specific indexes (e.g. tpc-Index-panel) that indicate a position of a first bit of a TPC command and/or TPC information (e.g. power control adjust state and TPC command) for each antenna panel. The closed-loop power control operation performed by the UE may include several steps.

In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the BS configures the UE with 4 specific indexes to indicate the first bit of a power control adjust value for each antenna panel and/or SRS resource set. For example, bit index #0 is for SRS resource set #0, bit index #4 is for SRS resource set #1, bit index #7 is for SRS resource set #2 and bit index #10 is for SRS resource set #3.

In a third step, the UE receives DCI format 2_2 on the CORESET that is associated with SRS resource set #1, and the UE receives multiple power control adjust values (e.g. TPC command) and antenna panel information (e.g. SRS resource set index) according to indexes corresponding to each of the SRS resource sets. In a fourth step, the UE applies the TPC command (e.g. "11" indicates increasing 3 dB TX power) to the SRS resource set #0 with the power control adjust value indicated in bit #0 and bit #1 for power control adjust accumulation (e.g. tpc-Accumulation parameter) of PUSCH transmission. The UE applies the TPC command (e.g. "10" indicates increasing 1 dB TX power) to SRS resource set #1 with the power control adjust value indicated in bit #4 and bit #5 for power control adjust accumulation (e.g. tpc-Accumulation parameter) of PUSCH transmission. The UE applies the TPC command (e.g., "11" indicates increasing 3 dB TX power) to SRS resource set #2 with the power control adjust value indicated in bit #7 and bit #8 for power control adjust accumulation (e.g. tpc-Accumulation parameter) of PUSCH transmission.

The UE applies the TPC command (e.g., "10" indicates increasing 1 dB TX power) to SRS resource set #3 with the power control adjust value indicated in bit #10 and bit #11 for power control adjust accumulation (e.g. tpc-Accumulation parameter) of PUSCH transmission associated with.

Selection of an antenna panel for PUSCH/PUCCH transmission and applying the power control adjust value may be based on the UE's behavior.

The UE may calculate a bit length of block that contains TPC information based a number of active antenna panels and/or a number of antenna panels supported by UE capability. For example, if the UE supports 4 antenna panels and the index (e.g. tpc-index-panel parameter) indicates the position of the first bit of TPC command is "1," the UE may assume the block contains 8 bits and each 2 bits correspond to the TPC command for one antenna panel.

The closed-loop power control operation performed by the UE may include several steps. In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the UE receives DCI format 2_2 on the CORESET that is associated with SRS resource set #1, and the UE receives multiple power control adjust values (e.g. TPC command) corresponding to each SRS resource set. Since the UE is configured with 4 SRS resource sets, the block in DCI format 2_2 may include 8 bits (i.e. 8 is obtained from number of bits for power control adjust value times the number of SRS resource sets).

In a third step, the UE applies the TPC command (e.g. "11" indicates increasing 3 dB TX power) to the SRS resource set #0 with a power control adjust value indicated in bit #0 and bit #1 of the block for power control adjust accumulation (e.g. tpc-Accumulation parameter) of PUSCH transmission. The UE applies the TPC command (e.g. "10" indicates increasing 1 dB TX power) to SRS resource set #1 with power control adjust value indicated in bit #2 and bit #3 of the block for power control adjust accumulation (e.g. tpc-Accumulation parameter) of PUSCH transmission.

The UE applies the TPC command (e.g. "11" indicates increasing 3 dB TX power) to SRS resource set #2 with power control adjust value indicated in bit #4 and bit #5 of the block for power control adjust accumulation (e.g. tpc-Accumulation parameter) of PUSCH transmission. The UE applies the TPC command (e.g. "10" indicates increasing 1 dB TX power) to SRS resource set #3 with power control adjust value indicated in bit #6 and bit #7 of the block for power control adjust accumulation (e.g. tpc-Accumulation parameter) of PUSCH transmission.

Approach #2: One Antenna Panel with More than One Power Control Adjust State

It is noted that a power control adjust state may not be mapped one-to-one to antenna panels. In this sense, the antenna panel(s) may be associated with the same power control adjust state, and the power control adjust value may be accumulated to the power control adjust state if the power control adjust state is associated with the antenna panel. For example, if two antenna panels are associated with the same power control adjust state, the accumulated power control adjust value may be increased if the power control adjust value of either antenna panel is indicated by the BS.

DCI format 2_2 may contain antenna panel information (e.g. SRS resource set index, antenna panel index, and/or TCI) in the block of DCI format 2_2, and the block further contains at least one of a power control adjust state and a TPC command. Therefore, the UE applies a power control adjust value for the indicated power control adjust state on the indicated antenna panel.

The closed-loop power control operation performed by the UE may include several steps. In a first step, the UE reports a number of antenna panels supported by UE capability, and the BS configures the number of active antenna panels and/or SRS resource sets to UE. For example, if the UE reports "8" supported antenna panels, the BS configures the UE with SRS resource set #0, SRS resource set #1, SRS resource set #2, and SRS resource set #3.

In a second step, the UE receives DCI format 2_2 on the CORESET that is associated with SRS resource set #1, and the DCI format 2_2 contains power control adjust value (e.g. TPC command), power control adjust state index (e.g. "0" indicates the first power control adjust accumulation state) and a SRS resource set index (e.g. "01" indicates SRS resource set #1). In a third step, the UE applies the TPC command (e.g. "11" indicates increasing 3 dB TX power) to the SRS resource set #1 with the first power control adjust accumulation state (e.g. tpc-Accumulation #1) for PUSCH transmission.

A power control adjust value is applied to the antenna panel via which UE received the DCI format 2_2, and the power control adjust state is indicated in DCI format 2_2.

The closed-loop power control operation performed by the UE may include several steps.

In a first step, the UE reports a number of antenna panels supported by UE capability, and the BS configures the number of active antenna panels and/or SRS resource sets to UE. For example, if the UE reports "8" supported antenna panels, the BS configures the UE with SRS resource set #0, SRS resource set #1, SRS resource set #2, and SRS resource set #3.

In a second step, the UE receives DCI format 2_2 on the CORESET that is associated with SRS resource set #1, and the DCI format 2_2 contains power control adjust value (e.g. TPC command), power control adjust state index (e.g. "0" indicates the first power control adjust accumulation state).

In a third step, the UE applies the TPC command (e.g. "11" indicates increasing 3 dB TX power) to SRS resource set #1 with the first power control adjust accumulation state (e.g. tpc-Accumulation #1) for PUSCH transmission.

A power control adjust value is applied to all configured antenna panels of the UE. The closed-loop power control operation performed by the UE may include several steps.

In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the UE receives DCI format 2_2 on the CORESET that is associated with SRS resource set #1, and the DCI format 2_2 contains power control adjust value (e.g. TPC command), power control adjust state index (e.g. "0" indicates the first power control adjust accumulation state). In a third step, the UE applies the TPC command (e.g. "11" indicates increasing 3 dB TX power) to SRS resource set #0, SRS resource set #1, SRS resource #2 and SRS resource set #3 with the first power control adjust accumulation state (e.g. tpc-Accumulation #1) for PUSCH transmission.

Approach #3: Multiple Antenna Panels Associate with One Power Control Adjust State An antenna panel configuration may contain a power control adjust state identity, and the UE may receive the antenna panel configuration configured by BS. It is noted that the antenna panel configuration contains antenna panel information (e.g. SRS resource set index, antenna panel index, and/or TCI), and the UE applies a power control adjust value to the antenna panels that are associated with the indicated power control adjust state identity.

The closed-loop power control operation performed by the UE may include several steps. In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the BS configures the UE based on the antenna panel configuration that contains a power control adjust state (e.g. power control adjust accumulation state). For example, SRS resource set #0 and SRS resource set #1 may be corresponded to power control adjust state #0, and SRS resource set #2 and SRS resource set #3 may be corresponded to power control adjust state #1.

In a third step, the UE receives DCI format 2_2 on the CORESET that is associated with SRS resource set #1, and the DCI format 2_2 contains a power control adjust value (e.g. TPC command), power control adjust state index (e.g. "0" indicates the first power control adjust accumulation state). In a fourth step, the UE applies the TPC command (e.g. "11" indicates increasing 3 dB TX power) to SRS resource set #0 and SRS resource set #1 with power control adjust accumulation (e.g. tpc-Accumulation parameter) for PUSCH transmission.

The BS may indicate a number of configured power control adjust states to the UE, and the UE may determine a length of a block in DCI format 2_2 according to the configured number of power control adjust states. It is noted that a number of power control adjust states supported by the UE may be dependent on UE capability.

The closed-loop power control operation performed by the UE may include the several steps. In a first step, the UE reports a number of supported panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the BS configures the UE with 4 power control adjust states, and the BS may further configure a relationship between each SRS resource set and each power control adjust state. For example, SRS resource set #0 may be corresponded to power control adjust state #0 and SRS resource set #1 may be corresponded to power control adjust state #1.

In a third step, the UE receives DCI format 2_2 on the CORESET that is associated to SRS resource set #1, and the DCI format 2_2 contains power control adjust value (e.g. TPC command), power control adjust state index. Since the UE is configured with 4 power control adjust states, the UE assumes a length of block for power control information in DCI format 2_2 is 4 (i.e. 2 bits for TPC command and 2 bits for power control adjust state index).

In a fourth step, the UE applies the TPC command (e.g. "11" indicates increasing 3 dB TX power) to SRS resource set #1 with the power control adjust accumulation (e.g. tpc-Accumulation parameter) for PUSCH transmission because the power control adjust state index in DCI format 2_2 is "01". The UE may reset accumulation of a power control adjust state if all the antenna panels corresponded to the power control adjust state are deactivated.

The closed-loop power control operation performed by the UE may include several steps.

In a first step, the UE reports a number of antenna panels supported by UE capability, and the BS configures the number of active antenna panels and/or SRS resource sets to the UE. For example, if the UE reports "8" supported antenna panels, the BS configures the UE with SRS resource set #0, SRS resource set #1, SRS resource set #2, and SRS resource set #3.

In a second step, the UE receives a power saving indicator/signaling (e.g. from the BS), and the UE turns off/deactivates an antenna panel corresponding to SRS resource set #0 and SRS resource #1. In a third step, the UE resets an accumulated power control adjust value of power control adjust state #0 because SRS resource set #0 and SRS resource #1 are corresponded to power control adjust state #0. It is noted that while the previous disclosure is based on the PUSCH, all disclosure related to DCI format 2_2 can be applied for PUCCH power control adjustment as well.

Figure 2:
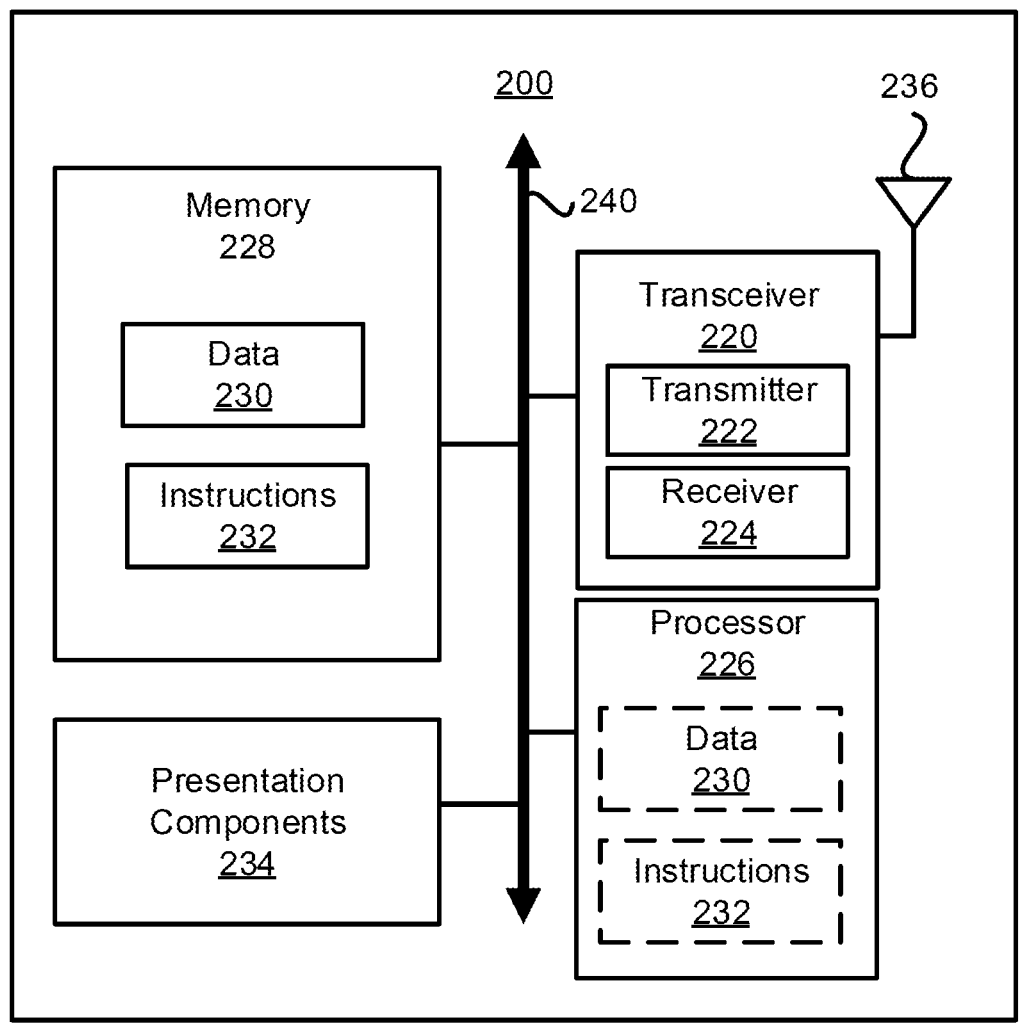
FIG. 2 is a block diagram illustrating a node for wireless communication, in accordance with example implementations of the present disclosure.

FIG. 2 illustrates a node 200 for wireless communication according to the present disclosure. As illustrated in FIG. 2, the node 200 may include a transceiver 220, a processor 226, memory 228, one or more presentation components 234, and at least one antenna 236. The node 200 may also include an RF spectrum band module, a BS communications module, a network communications module, and a system communications management module, input/output (I/O) ports, I/O components, and a power supply (not shown).

Each of these components may be in communication with each other, directly or indirectly, over one or more buses 240. The node 200 may be a UE or a BS that performs various disclosed functions as illustrated in FIG. 1.

The transceiver 220 includes a transmitter 222 with transmitting circuitry and a receiver 224 with receiving circuitry and may be configured to transmit and/or receive time and/or frequency resource partitioning information.

The transceiver 220 may be configured to transmit in different types of subframes and slots including, but not limited to, usable, non-usable and flexibly usable subframes and slot formats. The transceiver 220 may be configured to receive data and control channels.

The node 200 may include a variety of computer-readable media. Computer-readable media may be any media that can be accessed by the node 200 and include both volatile and non-volatile media, removable and non-removable media. Computer-readable media may include computer storage media and communication media. Computer storage media includes both volatile and non-media as well as removable media and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. Communication media includes wired media such as a wired network or direct-wired connection, and wireless media such as acoustic, RF, infrared and other wireless media. Combinations of any of the disclosed media should be included within the scope of computer-readable media.

The memory 228 may include computer-storage media in the form of volatile and/or non-volatile memory. The memory 228 may be removable, non-removable, or a combination thereof. Memory includes solid-state memory, hard drives, and optical-disc drives. As illustrated in FIG. 2, the memory 228 may store computer-readable, computer-executable instructions 232 (e.g., software codes) that are configured to cause the processor 226 (e.g., processing circuitry) to perform various functions disclosed with reference to FIG. 1. Alternatively, the instructions 232 may be configured to cause the node 200 (e.g., when compiled and executed) to perform various disclosed functions.

The processor 226 may include an intelligent hardware device, e.g., a central processing unit (CPU), a microcontroller, an ASIC, and etc. The processor 226 may include memory.

The processor 226 may process the data 230 and the instructions 232 received from the memory 228, and information via the transceiver 220, the base band communications module, and/or the network communications module. The processor 226 may also process information to be sent to the transceiver 220 for transmission via the antenna 236, to the network communications module for transmission to a core network.

One or more presentation components 234 presents data indications to a person or other device. Presentation components 234 include a display device, speaker, printing component, and vibrating component.

From the previous disclosure it is evident that various techniques can be used for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts.

As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method of closed-loop power control for a user equipment (UE) in multi-panel transmission, the method comprising:
    receiving a transmission power control (TPC) command carried by downlink control information (DCI) and indicating at least a power control adjust value;
    obtaining antenna panel information for identifying a characteristic of one of a plurality of antenna panels of the UE; and
    applying the power control adjust value to at least one of the plurality of antenna panels for physical uplink (UL) shared channel (PUSCH)/physical UL control channel (PUCCH) transmission according to the obtained antenna panel information,
    wherein:
    the antenna panel information is obtained from a base station and indicates a position of a first bit of the TPC command in the DCI for each of the plurality of antenna panels, and
    the power control adjust value is obtained according to the indicated position.

2. The method of claim 1, wherein the DCI includes at least one of a DCI format 0_0, a DCI format 0_1 and a DCI format 2_2.

3. The method of claim 1, wherein the obtained antenna panel information includes at least one of a sounding reference signal (SRS), a resource set index, an antenna panel index, an UL transmission configuration indicator, a power control adjust state index and an SRS resource index (SRI).

4. The method of claim 2, wherein the obtained antenna panel information is included in the DCI, and applying the power control adjust value comprises:
    applying the power control adjust value to an antenna panel via which the UE receives at least one of the DCI format 0_0, the DCI format 0_1 and the DCI format 2_2.

5. The method of claim 3, wherein the obtained antenna panel information is included in the DCI and indicates the power control adjust value and a corresponding antenna, panel, and applying the power control adjust value comprises:
    applying the power control adjust value to an antenna panel associated with the at least one of the SRS, the resource set index, the antenna panel index and the SRI.

6. The method of claim 1, wherein the obtained antenna panel information is obtained from the base station and indicates a PUCCH resource and a corresponding antenna panel, and applying the power control adjust value comprises:
    applying the power control adjust value to an antenna panel associated with the indicated PUCCH resource.

7. The method of claim 6, wherein the PUCCH resource is indicated by a PUCCH resource identity.

8. The method of claim 1, wherein the obtained antenna panel information is configured by the base station or included in the DCI and indicates a power control adjust state and a corresponding antenna panel, and applying the power control adjust value comprises:
    applying the power control adjust value to either an antenna panel with the indicated power control adjust state or at least one antenna panel associated with the power control adjust state.

9. The method of claim 8, wherein a bit length or a number of power control adjust states is configured by the base station or predetermined by the UE.

10. The method of claim 1, further comprising:
    calculating a bit length of a block in the DCI according to a number of bits of the power control adjust value, a number of active antenna panels of the plurality of antenna panels or a number of the plurality of antenna panels, wherein applying the power control adjust value comprises:
    applying the power control adjust value to each of the plurality of antenna panels according to an order of the calculated bit length.

11. The method of claim 1, further comprising:
    resetting a power control adjust value of a power control adjust state when one or more of the plurality of antenna panels associated with the power control adjust state are deactivated by the UE.

12. A user equipment (UE) in a wireless communication system, the UE comprising:
    a processor for executing computer-executable instructions; and
    a non-transitory machine-readable medium, coupled to the processor, for storing the computer-executable instructions, wherein the computer-executable instructions instruct the processor to:
    receive a transmission power control (TPC) command carried by downlink control information (DCI) and indicating at least a power control adjust value;
    obtain antenna panel information for identifying a characteristic of one of a plurality of antenna panels of the UE; and
    apply the power control adjust value to at least one of the plurality of antenna panels for physical uplink (UL)

shared channel (PUSCH)/physical UL control channel (PUCCH) transmission according to the obtained antenna panel information, wherein:

the antenna panel information is obtained from a base station and indicates a position of a first bit of the TPC command in the DCI for each of the plurality of antenna panels, and the power control adjust value is obtained according to the indicated position.

13. The UE of claim 12, wherein the obtained antenna panel information includes at least one of a sounding reference signal (SRS), a resource set index, an antenna panel index, an uplink transmission configuration indicator, a power control adjust state index and an SRS resource index (SRI).

14. The UE of claim 12, wherein:

the obtained antenna panel information is included in the DCI, and the computer-executable instructions further instruct the processor to:

apply the power control adjust value to an antenna panel via which the UE receives at least one of a DCI format 0_0, a DCI format 0_1 and a DCI format 2_2.

15. The UE of claim 13, wherein:

the obtained antenna panel information is included in the DCI and indicates the power control adjust value and a corresponding antenna panel, and the computer-executable instructions further instruct the processor to:

apply the power control adjust value to an antenna panel associated with at least one of the SRS, the resource set index, the antenna panel index and the SRI.

16. The UE of claim 12, wherein:

the obtained antenna panel information is obtained from the base station and indicates a PUCCH resource and a corresponding antenna panel, and the computer-executable instructions further instruct the processor to:

apply the power control adjust value to an antenna panel associated with the indicated PUCCH resource.

17. The UE of claim 12, wherein:

the obtained antenna panel information is configured by the base station or included in the DCI and indicates a power control adjust state and a corresponding antenna panel, and the computer-executable instructions further instruct the processor to:

apply the power control adjust value to either an antenna panel with the indicated power control adjust state or at least one antenna panel associated with the power control adjust state.

18. The UE of claim 12, wherein the computer-executable instructions further instruct the processor to:

calculate a bit length of a block in the DCI according to a number of bits of the power control adjust value, a number of active antenna panels of the plurality of antenna panels or a number of the plurality of antenna panels, wherein applying the power control adjust value comprises:

applying the power control adjust value to each of the plurality of antenna panels according to an order of the calculated bit length.

* * * * *